Figure 1:
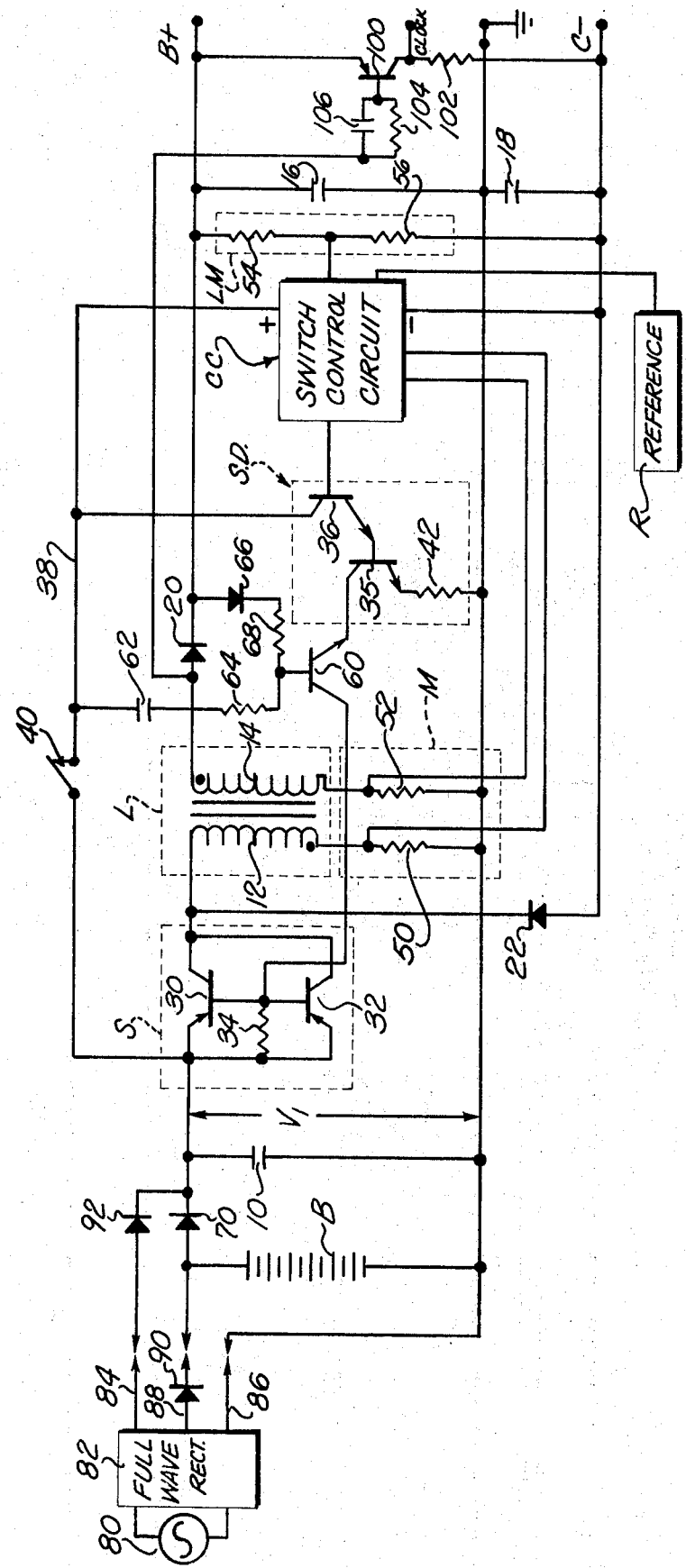

United States Patent [19]
Kime, Jr.

[11] 3,792,341
[45] Feb. 12, 1974

[54] POWER SUPPLY CIRCUITRY HAVING BASE DRIVE INHIBIT CONTROL

[75] Inventor: Robert Clarence Kime, Jr., Fairview Park, Ohio

[73] Assignee: Keithley Instruments, Inc., Solon, Ohio

[22] Filed: Dec. 22, 1971

[21] Appl. No.: 210,908

[52] U.S. Cl. ............. 323/22 T, 307/80, 307/260, 317/31, 320/13, 323/4, 323/20, 323/DIG. 1
[51] Int. Cl. ............................................. G05f 1/58
[58] Field of Search ...... 307/17, 33, 34; 317/33 VR, 317/31; 321/2, 18; 323/9, 22 T, 38, DIG. 1

[56] References Cited
UNITED STATES PATENTS

| | | | |
|---|---|---|---|
| 3,643,153 | 2/1972 | Hanson et al. | 323/22 T |
| 3,104,353 | 9/1963 | Theobald | 317/33 VR |
| 3,381,202 | 4/1968 | Loucks et al. | 321/2 |
| 3,391,330 | 7/1968 | Grossoehme | 323/22 T |
| 3,641,422 | 2/1972 | Farnsworth et al. | 323/DIG. 1 |

Primary Examiner—A. D. Pellinen

[57] ABSTRACT

A D.C. power supply circuit having a series semiconductor for supplying energizing current to a load in accordance with base drive current supplied thereto from a drive circuit. Base drive inhibiting means are interposed between the semiconductor and the base drive circuit for inhibiting base drive current as the output voltage decreases in magnitude below a desired level. Circuitry is also employed for controlling the drive means to alternately turn on and turn off the semiconductor means acting as a series switch in a switching regulator circuit, and output circuitry serves for providing clock pulses at a frequency dependent upon the switching frequency of the semiconductor means.

5 Claims, 2 Drawing Figures

POWER SUPPLY CIRCUITRY HAVING BASE DRIVE INHIBIT CONTROL

This invention relates to improvements particularly applicable for use in a series voltage regulator, such as a switching regulator, and will be described with particular reference thereto; although, the invention may be employed in other electrical circuits.

Series voltage regulator circuits typically employ a regulating semiconductor which is connected in series with a voltage source to supply energy to a load. If the source voltage decreases in magnitude the regulating circuitry may operate upon the semiconductor to increase the current flow therethrough to maintain a regulated output voltage. Depending on the type of circuitry and components employed, severe increases in current flow through the semiconductor may result in power dissipation at the semiconductor, resulting in generated heat. This may damage or possibly destroy the semiconductor. Where the voltage source is obtained from batteries, the increased current flow will further load the battery so that its voltage decreases still further as energy is withdrawn. If this condition continues, the loading may become destructive. For example, if the batteries include typical alkaline, nonrechargeable batteries, then as the source voltage decreases the regulator will tend to increase the current flow through the semiconductor. This causes additional energy to be withdrawn from the batteries and the internal resistance of the alkaline cells will increase. This generates heat which may cause the battery cells to break, resulting in battery leakage or venting. Not only will the battery be of no use upon venting, the vented corrosive chemicals may damage the power supply circuitry. If rechargeable nickel cadmium batteries be employed, then at least one cell in a multiple cell battery arrangement may discharge to a level such that the cell will become negatively charged by energy received from the adjacent cells. Once such a rechargeable cell has been reverse charged, its capability to receive a normal charge has been reduced and, hence, that cell will not operate efficiently. Consequently, it is desirable that such power supply circuits employing a series semiconductor, or the like, be provided with circuitry for inhibiting the conductivity of the semiconductor when necessary to prevent damage to the batteries.

In addition to protecting the batteries in such a circuit, it is also desirable to prevent damage to the series regulating semiconductor. For example, if the source voltage drops sufficiently that the regulating circuitry cannot maintain the output voltage at the desired regulated level, then the regulating circuitry tends to maintain the semiconductor in a conductive state so that current will continue to be drawn from the battery supply. If the current attains a magnitude sufficient to saturate the transformer, as in a switching regulator, then a voltage drop will occur across the semiconductor causing power dissipation and the accompanying generation of heat. This, of course, may severely damage if not destroy the semiconductor. It is therefore desirable in such series regulator circuits to provide circuitry for inhibiting the base current drive to the semiconductor device as the circuitry senses that the input voltage of the source has decreased to the point that the regulated output voltage cannot be maintained.

Regulated power supply circuits are typically employed to provide regulated D.C. voltage for such electrical instrumentation as analog-to-digital converters which employ counters for counting clock pulses. If the regulated power supply circuit includes oscillator type circuitry, as in the case of a switching regulator, then the resultant frequency signal may beat against the clock source, resulting in a degradation in the accuracy of the digital counting function. It would be desirable that circuitry be employed so that the frequency signal of the power supply be utilized to provide a train of clock pulses for the analog-to-digital converter.

The present invention is directed toward improvements in power supply circuitry for satisfying the foregoing needs.

Consequently, it is an object of the present invention to provide in a series regulating power supply circuit, means for controlling the conductivity of the series semiconductor so as to innibit current flow therethrough when the regulated output voltage cannot be sustained by the regulating circuitry.

It is a still further object of the present invention to provide protective circuitry particularly applicable for use with a series regulated power supply circuit for minimizing battery drain upon detection of low battery voltage to thereby protect against reverse charging a chargeable nickel cadmium battery or to prevent venting of a conventional alkaline battery.

It is a still further object of the present invention to provide a protective circuit particularly applicable for use with a series regulated circuit to protect the series semiconductor from damage due to excessive power dissipation resulting from low source voltage conditions.

To achieve the foregoing objectives, the invention provides that energizing current be supplied to a load circuit through a semiconductor having its emitter-collector circuit connected in series with a D.C. voltage source, and driven by a driving circuit which serves to provide base drive current flow so as to control the conductivity of the semiconductor. Protective circuitry is employed, including base drive inhibiting circuitry including a second semiconductor having its emitter-collector circuit connected in series with the emitter-base circuit of the first semiconductor. The second semiconductor is controlled in its level of conductivity in dependence upon the magnitude of the output voltage of the load circuit in such a manner that the base drive current for the first semiconductor is inhibited as a function of decreases in the load circuit output voltage below its desired level.

Still further in accordance with the present invention, the conductivity level of a semiconductor connected for supplying energizing current from a voltage source to a load circuit is controlled by a base drive circuit. Additional circuitry is employed to provide a train of clock pulses exhibiting a frequency in dependence upon the switching frequency of the semiconductor as it is being switched between on and off conditions by the drive circuit under the control of a switch control circuit.

Figure 2:
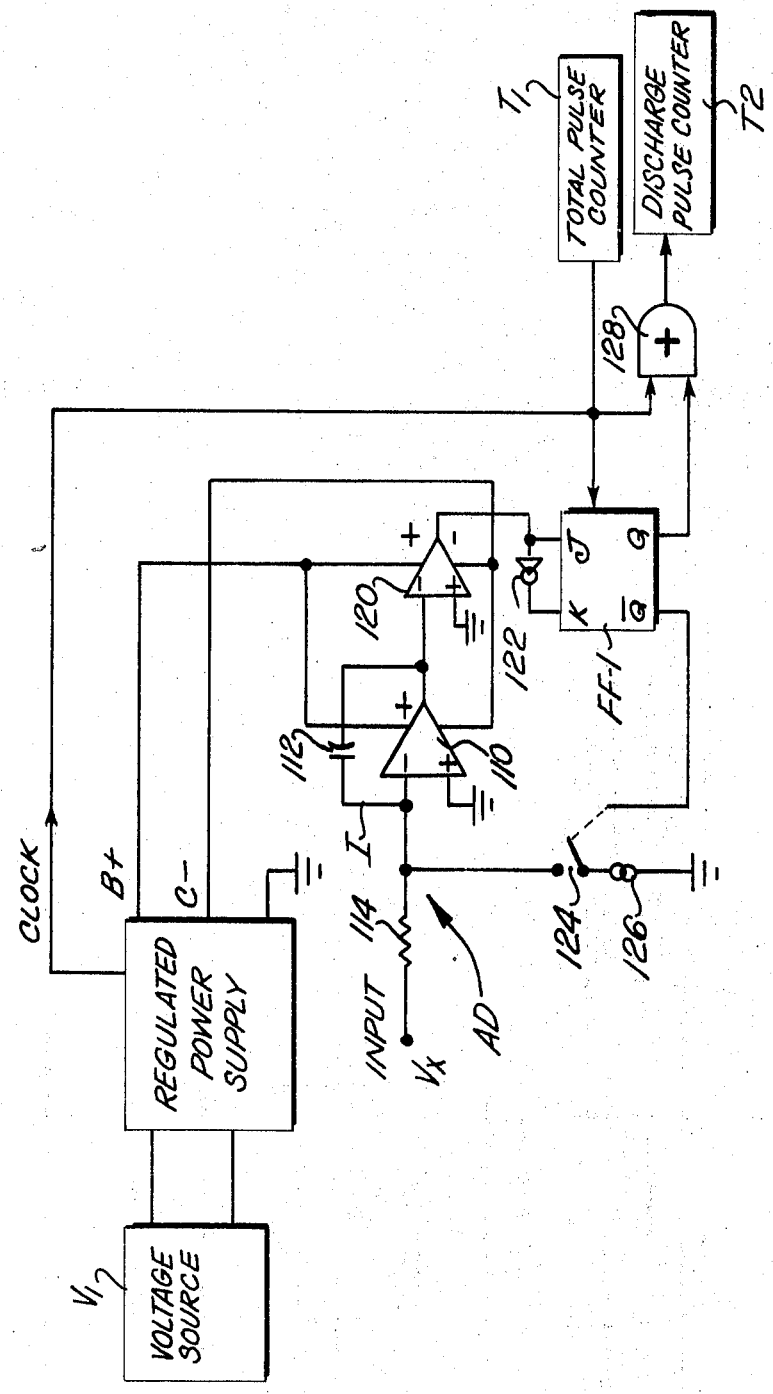

The foregoing and other objects and advantages of the invention will become more readily apparent from the following description of the preferred embodiment of the invention as taken in conjunction with the accompanying drawings which are a part hereof and wherein:

FIG. 1 is a schematic illustration of a series regulating circuit employing the present invention; and, FIG. 2 is a combined schematic-block diagram illustration of the series regulating circuit connected for supplying regulated output voltage and clock pulses to an analog-to-digital converter.

Referring now to the drawings wherein the showings are for purposes of illustrating a preferred embodiment of the invention only and not for purposes of limiting same, FIG. 1 illustrates a D.C. voltage regulator, of the series switching type, employing the present invention. It is to be appreciated, however, that the invention may be employed in conjunction with other series regulating circuits which may or may not take the form of switching regulators. The disclosed switching regulator is illustrated and described in greater detail in a copending U.S. Pat. application Ser. No. 210,999 filed on Dec. 22, 1971, in the name of Adrian Paul Brokaw and assigned to the same assignee as the present invention. That switching regulator serves to provide regulated B+, C− and ground potential at its output terminals from an unregulated input D.C. voltage $V_1$. The input voltage $V_1$, as taken across a smoothing capacitor 10, is obtained from either a battery supply or a rectified A.C. voltage source. Briefly, the regulator circuit includes a series switch S which serves to supply energizing current from the input voltage $V_1$ to the primary winding 12 of an inductor-transformer L during the time that switch S is on. When the switch is turned off, energy is released from the inductor-transformer from both the primary winding 12 and the secondary winding 14 so that current flows to charge load capacitors 16 and 18, across which the regulator B+ and C− voltages are respectively obtained. Diodes 20 and 22 are respectively connected in the series charging circuits of capacitors 16 and 18 to prevent energy transfer to the capacitors, except when switch S is off. Switch S is alternately turned on and off under the control of a switch control circuit CC which alternately provides turn on and turn off signals in accordance with sensed input and loading conditions. These turn on and turn off signals are relayed to switch S by means of a switch driven circuit SD so that the ratio of switch on time to switch off time is controlled in a manner to maintain the regulated output voltages.

Switch S preferably includes at least one semiconductor. As shown in FIG. 1, there is provided a pair of PNP transistors 30 and 32 having their emitter-collector circuits connected in parallel and their base electrodes being connected together in common. A base drive resistor 34 is connected between the commonly connected emitters and the commonly connected base electrodes. The level of conductivity of switch S is determined by the base drive current flow for the switching transistors as provided by a switch driver NPN transistor 35 having its collector to emitter circuit connected to the commonly connected base electrodes of the switching transistors. Transistor 35 is, in turn, driven by a transistor 36 which is directly controlled by the switch control circuit CC. Transistors 35 and 36 are connected in a typical Darlington arrangement with the collector of transistor 36 being referenced to the positive bias supply line 38 obtained from the positive terminal of a smoothing capacitor 10. Consequently, whenever the bias control line switch 40 is closed, operating potential is available for operating the switch driver circuit. Whenever the switch control circuit CC provides a turn on or positive signal, transistor 36 is biased into conduction so as to, in turn, drive transistor 35 into conduction so that a base drive current is provided through a path from the emitter to base electrodes of the switching transistors and, thence, through the collector to emitter circuit of transistor 35 and through a series resistor 42 to ground. The base drive is normally sufficient to operate the switching transistors 30 and 32 is a saturated state.

The switch control circuit provides the turn on and turn off signals to the switch driver circuit SD in dependence upon the input signals applied to the control circuit as taken from an inductor-transformer monitoring circuit M, a load monitoring circuit LM and a negative reference source R. The specific circuitry employed and the details of operation are set forth in the aforesaid United States application filed in the name of Adrian Paul Brokaw. Briefly, the monitoring circuit M employs a pair of resistors 50 and 52 which are respectively connected in series with the primary winding 12 and the secondary winding 14. The voltages developed across these two resistors are proportional to the currents flowing through the respective windings and these voltages are applied to the switch control circuit. The load monitoring circuit LM employs a pair of series connected resistors 54 and 56 connected between the B+ and C− output terminals, with the midpoint between the two resistors being connected to the switch control circuit for comparison with the reference voltage obtained from the reference source R. The ratio of switch on to switch off time is then controlled in dependence upon such factors as the level of the input voltage $V_1$ and the loading presented to the B+ and C− terminals. As the regulated output voltage terminals are loaded the ratio of switch on time to switch off time will be increased, tending to increase the period of conductivity of the switching transistors 30 and 32 so that the current flow through the switches during the switch on time will continue to increase in magnitude so long as the current does not reach its steady state level, or until the inductor-transformer saturates.

Severe loading conditions, such as a short circuit or a severe decrease in the input voltage $V_1$, would normally result in a longer switch on time. If this condition is permitted to continue, the inductor-transformer L may saturate at which time a substantial voltage drop will result across the switching transistors. This, of course, will result in substantial power being dissipated across the transistors and this will result in generation of heat, tending to severely damage if not destroy the switching transistors.

If the input voltage is obtained from a battery source, continued battery drain as the switching transistors remain on may result. For example, if the battery source includes a plurality of series connected, rechargeable, nickel cadmium batteries, then as energy is withdrawn from the batteries one of the cells may discharge to a zero voltage condition and commence receiving energy from the other series connected batteries in a direction opposite to the charging direction so as to build up a negative voltage. In such case, the reverse charge will cause build up of an internal pressure and reduce the battery's capacity to receive a full charge during subsequent recharge operation. Consequently, if such a battery is permitted to discharge to the point that it receives a negative charge, its capacity to be fully recharged has been reduced. As a typical alkaline, nonchargeable battery ages, its internal resistance increases resulting in generated heat. If this condition continues, it would conceivably result in breakage of the battery seal causing battery leakage or venting. The corrosive chemicals discharged may damage the circiutry in the vicinity of the battery cells.

In accordance with the present invention, a low voltage cutout circuit serves to inhibit the base drive to the switching transistors 30 and 32 whenever the B+ ouput voltage cannot be sustained by the regulating circuitry, such as upon aging of the batteries or a short circuit across the load terminals. The base drive is continuously inhibited in a regenerative fashion as the output voltage decreases until there is insufficient base drive to maintain transistors 30 and 32 in a conductive state.

The low voltage cutout protective circuitry preferably employs a semiconductor, such as a NPN transistor 60, in the base drive circuit between the switching transistors and the switch driver circuit SD. As shown in FIG. 1, the NPN transistor 60 has its collector to emitter circuit connected between the base electrodes of the switching transistors 30 and 32 and the collector of transistor 35 in the switch driver circuit SD. During start up of the voltage regulator, switch 40 is closed to provide operating potential for the switch driver circuit SD and the switch control circuit CC. This also provides a path for current to flow through capacitor 62 and resistor 64 to drive transistor 60 into conduction. The time constant of capacitor 62 and resistor 64 is sufficiently long that the regulating circuit will have sufficient time to bring the output voltages substantially up to the regulated B+ and C− values. This base drive for transistor 60 is sufficient to maintain this transistor in a saturated state so that it does not affect the operation of the base drive from transistor 35 to the switching transistors 30 and 32. Once capacitor 62 is fully charged, transistor 60 is maintained in its saturated state by the base drive afforded through diode 66 and resistor 68 connected in a forward direction from the B+ output terminal to the base electrode of transistor 60. This base drive path continues to maintain transistor 60 saturated so that it provides a low impedance path in the base drive circuit for the switching transistors.

With transistor 60 being in a saturated state, the impedance presented to the base drive for the switching transistors 30 and 32 is essentially negligible. Consequently, the switch control circuit CC operates to alternately provide turn on and turn off signals to the switch driver circuit SD and transistor 35 periodically provides base drive flow sufficient that the switching transistors 30 and 32 are periodically conductive in a saturated state. In normal operation, as the input voltage $V_1$ decreases, or as the output voltage decreases, the switch control circuit CC functions to increase the ratio of switch on time to switch off time. This causes an increase in the amount of current transmitted through the switching transistors to the inductor-transformer L to increase the amount of energy stored therein for transfer to the load circuits to sustain the regulated output voltages at their desired B+ and C− levels. However, a severe loading condition or battery discharge may result in a condition wherein the regulating circuitry cannot sustain the output voltage at a level approaching that of the desired B+ and C− levels. Consequently, the switching transistors will remain on for a longer period of time, causing more current to be drawn from the voltage source. This condition is sensed by diode 66 and resistor 68 in that as the output voltage falls, and cannot be sustained at the B+ level, there will be a decrease in the base drive current provided through the diode and resistor to transistor 60. Consequently, transistor 60 will no longer be saturated and will present an increased impedance to inhibit the base drive to the switching transistors. The switching transistors will tend to transmit less current, even though the switching regulator has attempted to operate upon the transistors to provide more current and the output voltage will continue to decrease in magnitude. This operation is regenerative and diode 66 and resistor 68 continue to sense the decreasing output voltage to further reduce the base drive to transistor 60. This operation will continue until the impedance presented by transistor 60 is sufficient that there will be insufficient base drive to maintain transistors 30 and 32 in a conductive state. To restart the regulating circuit, the control switch 40 must now be opened so that capacitor 62 will be permitted to discharge through the regulating circuit. Upon reclosure of the switch, the initial current flow through the capacitor will function to drive transistor 60 into conduction in the manner described hereinbefore.

The voltage $V_1$ to operate the regulating circuit may be obtained from either a battery source or from a rectified D.C. source. The battery source B may take the form, for example, of six series connected, one cell, nickel cadmium batteries each exhibiting a voltage rating on the order of 1.2 volts. A diode 70 is interposed between the batteries and the smoothing capacitor 10 to prevent damage to the batteries and the regulating circuit in the event that the batteries are connected backward. In the event the power supply circuit is employed in a portable battery powered instrument, such as a voltmeter, the batteries B may remain in place, as shown by the schematic illustration of FIG. 1. Provisions are made, however, to obtain the input voltage $V_1$ from an A.C. source 80. In such case, the A.C. source is rectified as with a full wave rectifier 82 to provide a positive output terminal 84 and a ground output terminal 86 and a charging terminal 88. To accomplish battery charging, the charging terminal 88 is connected through a diode 90 to the regulating circuitry so that charging current may be applied in the proper direction to batteries B. So that the batteries are not used when the A.C. source is connected, it is preferred that the maximum battery voltage be less than the rectified voltage on output terminal 84. For example, the maximum battery voltage may be on the order of 9 volts and the A.C. rectified voltage at terminal 84 may be on the order of 12 volts. The circuitry also includes another diode 92 having its cathode connected in common with that of diode 70. Thus, with the A.C. rectified source connected, diode 92 will reverse bias diode 70 so that current will not be drawn from battery B. Additionally, diode 92 prevents damage to the instrument in the event that output terminals 84 and 86 are reversed when connected to the regulating circuit.

The regulating power supply provides B+ and C− regulated output voltages. The B+ voltage may be on the order of +5 volts and the C− voltage may be on the order of −12 volts. During the operation of the switching regulator, the switching transistors 30 and 32 turn on and off through the switch driver SD in response to alternate turn on and turn off signals provided by the switch control circuit CC. In accordance with the invention, clock pulses are provided at this switching frequency with the clock pulses alternating between the B+ and C− levels. To achieve this, a PNP transistor 100 is connected such that its emitter is referenced to the B+ output terminal and its collector is connected through a resistor 102 to the C− terminal. Clock pulses are obtained from the collector of transistor 100 as the transistor is turned on and off through its base drive circuit which is referenced to a point imtermediate the secondary winding 14 and diode 20 through a base drive current control resistor 104. Capacitor 106 is connected in parallel with resistor 104 to decrease the rise and fall times of the base drive signal. As shown in FIG. 2, this train of clock pulses may be employed with an analog-to-digital converter circuit requiring a source of clock pulses as well as a regulated power supply circuit.

As shown in FIG. 2, the related power supply circuit of FIG. 1 receives D.C. voltage from a voltage source $V_1$ which, as described hereinbefore, may be obtained from a battery source B or by rectifying an A.C. source 80. The power supply circuit provides ground potential, C− potential and B+ potential. In addition, the regulated power supply provides a train of clock pulses having a frequency dependent on the switching frequency of the series switch in the regulating circuitry. The analog-to-digital converter AD employs a pair of operational amplifiers 110 and 120 which receive operating B+ and C− potential from the power supply as well as the clock pulses for counting purposes. A more detailed description of the analog-to-digital converter and its mode of operation is found in the copending U.S. application Ser. No. 186,006, filed on Oct. 4, 1971 in the names of S. Kurtin, M. Anthony, and W. Watrous, and assigned to the same assignee as the present invention. Briefly, converter AD serves to convert an input voltage $V_x$ to digital pulses which are utilized by a total pulse counter $T_1$ and a discharge pulse counter $T_2$ to provide an indication as to the magnitude of the input voltage.

The input voltage $V_x$ is applied to an integrating circuit I which includes operational amplifier 110 having its non-inverting input referenced to ground and an integrating capacitor 112 connected between the inverting input and the amplifiers output circuit. The inverting input of the amplifier, which serves as a summing point is connected through a resistor 114 to receive the input voltage $V_x$. The output signal from the integrator I is applied to the inverting input of amplifier 120 serving in the capacity of a level detector for comparing the integrated output signal with a reference, such as ground potential. As the integrated output signal becomes more negative relative to ground, it will reach a point where the level detector 120 will provide a positive output signal. This signal is applied to a clock enabled JK flip-flop FF-1. The JK flip-flop has two inputs J and K and two outputs Q and $\bar{Q}$ and a set terminal for receiving clock pulses from the regulated power supply circuit. Whenever the output of the level detector 120 goes positive, a positive or binary 1 signal is applied to the input terminal J and by means of an inverter amplifier 122 a binary 0 signal is applied to input terminal K. Once a clock pulse is applied to the set terminal these input conditions are respectively present at the output terminals Q and $\bar{Q}$ so that output terminal Q carries a binary 1 signal and output $\bar{Q}$ carries a binary 0 signal. A binary 0 signal from the $\bar{Q}$ output terminal serves to close a switch 124 and present a negative constant current cource 126 to the summing point of the integrator. Consequently, energy is withdrawn from capacitor 112 until the switch is reopened.

When the integrator's output becomes positive relative to that applied to the noninverting input of the level detector 120, the level detector will change state to provide a negative or binary 0 signal. The binary 0 signal is applied to the J input terminal and by means of inverter amplifier 122 a binary 1 signal is applied to input terminal K. When the flip-flop is next enabled by a clock pulse from the regulated power supply source, these signals will be present on the Q and $\bar{Q}$ output terminals of the flip-flop. The binary 1 signal obtained from the $\bar{Q}$ output terminal will open switch 124.

During the time that switch 124 is closed to withdraw energy from capacitor 112, output terminal Q of flip-flop FF-1 carries a binary 1 signal. This enables an AND gate 128 so that clock pulses may be passed by the AND gate to the discharge counter $T_2$. During the operation of the analog-to-digital converter AD the total pulse counter $T_1$ will count a predetermined number of clock pulses while the discharge pulse counter $T_2$ will count only those clock pulses occurring during the times that switch 124 is closed. The relationship between the number of pulses counted by counter $T_2$ and those counted by counter $T_1$ is related to the magnitude of the voltage $V_x$. It is to be noted that the frequency of operation of the level detector 120 will in this circuit be dependent upon the integrated output signal level, as well as the occurrence of clock pulses. Consequently, output signal pulses obtained from this point or, for that matter, from the output terminal Q of flip-flop FF-1 will exhibit a frequency related to the voltage $V_x$ to thereby obtain a voltage to frequency converter. It is to be specifically noted that the clock pulses are obtained from the switching regulator, as opposed from a separate source of clock pulses. Consequently, the power supply is automatically synchronized with the clock pulses as opposed to the typical case wherein clock pulses are obtained separately from the power supply and wherein such clock pulses may beat against the oscillations of the power supply circuit.

From the foregoing description it is evident that the present invention employs circuitry, such as transistor 60 and its associated components, for inhibiting the base drive to the switching transistors 30 and 32 in response to low voltage conditions resulting from severe loading or a low battery voltage. If desired, the regulating circuitry may take the form of a typical series regulator as opposed to the disclosed switching regulator. Where a switching regulator is employed, the present invention also provides circuitry, such as transistor 100 and its associated components, for providing a train of clock pulses which may be advantageously utilized with an analog-to-digital converter associated with the power supply circuit. However, analog-to-digital converters or voltage to frequency converters other than that as shown in FIG. 2 may be employed.

The invention has been described with reference to a preferred embodiment, however, it is to be appreciated that the invention is not limited to same as various modifications may be made without departing from the spirit and scope of the invention as defined in the appended claims.

What is claimed is:

1. An electrical circuit comprising a load circuit, means for supplying energizing current to said load circuit to obtain a load output voltage and including first transistor means having its emitter-collector circuit connected in series with a D.C. voltage source for supplying energizing current therethrough to said load circuit, drive means for providing base drive current flow for controlling the conductivity of said first transistor means, base drive inhibiting means including second transistor means having its emitter-collector path interposed between said drive means and said first transistor and connected in series with the emitter base circuit of said first transistor and circuit means for varying the conductivity of said second transistor means for presenting an increasingly higher impedance path to said base drive current as said output voltage decreases below a desired level, bias voltage supplying circuit means including switching means for supplying bias voltage from said voltage source through said switching means to said drive means to render same operative when said switching means is closed, and turn on circuit means connected to said bias voltage supply circuit means for supplying a turn on signal to the base of said second transistor means to provide an initial low impedance path to said base drive current when said driver means is operative to provide said base drive current flow.

2. An electrical circuit as set forth in claim 1 wherein said controlling circuit means includes base drive circuit means connecting the output load circuit with the base of said second transistor means in such a manner that as said output voltage decreases in magnitude said base drive circuit means tends to turn said second transistor means off.

3. An electrical circuit as set forth in claim 2 wherein said base drive circuit means includes a diode and a resistor connected together in a series circuit between the output load circuit and the base of said second transistor means.

4. An electrical circuit as set forth in claim 1 wherein said turn on circuit means includes delay means for delaying the supply of said turn on signal until said output voltage initially attains a level corresponding with said desired level.

5. An electrical circuit as set forth in claim 4 wherein said delay means includes a capacitor connected together in series with a resistor between said switching means for supplying said bias voltage and the base of said second transistor means.

* * * * *